Patented Aug. 24, 1948

2,447,587

UNITED STATES PATENT OFFICE 2,447,587

ACYL GLYCINE AMIDES

Henry Martin and Hans Gysin, Basel, Switzerland, assignors to J. R. Geigy A. G., Basel, Switzerland, a Swiss firm No Drawing. Application August 28, 1944, Serial No. 551,636. In Switzerland December 18, 1942

4 Claims. (Cl. 260—561)

This application is a continuation-in-part application to our copending patent application Ser. No. 510,402, filed November 15, 1943.

Heterocyclic as well as aromatic carboxylic acid amides have been described repeatedly as stimulants. Contrarily thereto the corresponding compounds of the aliphatic series often show an opposite efficacy. Thus, for instance, the isovalerianic acid diethylamide possesses a calming effect (cf. Deutsche med. Wochenschrift 1901, No. 49); the methylethyl acetic acid diethyl amide also shows the same efficacy (cf. Archiv der Pharmazie 1935, 202).

We have now surprisingly found that disubstituted amides of acylated aliphatic N-monoalkyl- or N-monocyclo-alkyl-amino carboxylic acids respectively possess valuable therapeutical properties. The said compounds may be prepared according to various methods.

For instance the said products may readily be recovered by acylating amino carboxylic acid amides which are N-monoalkylated or N-monocycloalkylated respectively. For the acylation the various carboxylic acids or their functional derivatives, such as the halides, esters and anhydrides, are suitable. Compounds which may be used for this purpose are, for instance, the following ones: acetic acid, propionic acid, butyric acid, isobutyric acid, crotonic acid, methyl propiolic acid, valerianic acid, $\alpha$-butine-$\alpha$-carboxylic acid, $\gamma$-butine-$\alpha$-carboxylic acid, isovalerianic acid, trimethyl acetic acid, allyl acetic acid, $\alpha$:$\beta$-dimethyl acrylic acid, $\beta$:$\beta$-dimethyl acrylic acid, capronic acid, isopropyl propiolic acid, tertiary butyl acetic acid, diethyl acetic acid, methyl-isopropyl acetic acid, sorbic acid, $\alpha$:$\beta$:$\beta$-trimethyl-acrylic acid and the like, moreover, the halides of the carbonic acid, carbonic acid ester, carbonic acid amides, oxalic ester- or oxamic acid halides and so on. Furthermore, there may be used halides of aliphatic alkoxy or alkylmercapto acids respectively, such as ethoxy acetic acid, $\alpha$-ethoxy propionic acid, $\alpha$-methylmercapto propionic acid, $\alpha$-ethylmercapto propionic acid, $\alpha$-propoxypropionic acid, $\alpha$-isopropoxy propionic acid, $\alpha$-methoxy butyric acid, $\alpha$-methylmercapto butyric acid, $\alpha$-ethoxy isobutyric acid, $\alpha$-propoxy isobutyric acid, $\alpha$-isopropoxy isobutyric acid and the like. Moreover, there come into question halides, esters or anhydrides of phenyl acetic acid, 3:4-dimethoxy-cinnamic acid, anisic acid, veratric acid, trimethylether gallic acid, acetyl salicyclic acid, hexahydrobenzoic acid, furane-$\alpha$-carboxylic acid, $\gamma$-pyranecarboxylic acid, 2:6-dimethyl dihydropyrane-3-carboxylic acid, dimethyl coumalic acid, pyridine-$\beta$-carboxylic acid, pyrazine carboxylic acid, 3:5-dimethylisoxazol-4-carboxylic acid and so forth.

As N-alkylated or N-cycloalkylated aminocarboxylic acid amides there come into consideration such ones of the $\alpha$-series as well as of the $\beta$-series. The same may be obtained by interaction of $\alpha$- or $\beta$-halogen carboxylic acid amides with primary aliphatic or primary cycloaliphatic amines, such as methylamine, ethylamine, propylamine, isopropylamine, allylamine, butylamine, isobutylamine, secondary butylamine, cyclopentylamine, cyclohexylamine and so on. The $\alpha$- or $\beta$-halogen carboxylic acid amides are produced according to known methods from the corresponding acids or their functional derivatives with secondary amines, such as dimethylamine, methylethylamine, diethylamine, methylpropylamine, dipropylamine, diallylamine, ethylcyclohexylamine, methylaniline, methylbenzylamine, piperidine, $\alpha$-pipecoline, morpholine and so on.

A further kind suitable for the preparation of the claimed compounds consists in causing acylated aliphatic N-alkyl- or N-cycloalkylamino carboxylic acids respectively or their functional derivatives being acylated by any suitable carboxylic acid to react with secondary amines; furthermore, the salts of the acylated aliphatic carboxylic acids can be interacted with carbamic acid halides deriving from secondary amines. Another way for the production of these compounds consists in causing monoalkyl amides or monocycloalkyl amides of suitable carboxylic acids to react with aliphatic $\alpha$- or $\beta$-halogen carboxylic acid amides, the amide groups of which being twice substituted. Finally, it is also possible to subsequently alkylate or cycloalkylate aliphatic amino carboxylic acid amides which are still acylated by suitable carboxylic acids and the amide groups of which still possess replaceable H-atoms (cf. Titherley, J. Chem. Soc. London 79, 391 (1901)).

The new compounds have been found to be good therapeutics, the same being especially used as analeptics; partly they are also suitable as solving assistants. The new compounds can be used as such ones or even in mixture with each other.

The present invention will now be illustrated by the following examples, wherein the parts are by weight, unless otherwise stated. Of course, this invention shall not be limited to the following examples.

EXAMPLE 1

149.5 parts of chloroacetic acid diethyl amide are dissolved in 300 parts by volume of absolute benzene and heated to 110°–120° C. with 100 parts of ethylamine in the autoclave. After cooling the ethylamine hydrochloride is filtered off, then the benzene solution is treated with water and freed from any dissolved ethylamine hydrochloride by means of potassium lye. After distillation of the benzene the ethylamino acetic acid diethyl amide is rectified in vacuo. This compound boils at a pressure of 12 mm. at 113°–116° C. It is miscible with water and with organic solvents.

31.6 parts of ethylamino acetic acid diethyl amide are dissolved in 100 parts by volume of benzene and, while cooling, 13.4 parts of diethyl acetic acid chloride are added. After some time the formed ethylamino acetic acid diethyl amide hydrochloride is filtered off and the filtrate is freed from benzene. The diethyl amide is dissolved in water and freed from any ethylamino acetic acid diethyl amide hydrochloride still present by shaking with alkalis, e. g., with potassium hydroxide. The remaining product is finally rectified in high vacuo, B. P. at 0.3 mm. pressure=134°–136° C. It is miscible with water and with organic solvents like ether, benzene, alcohol and so on, and has the following formula:

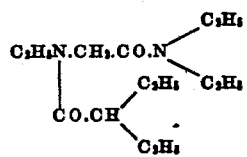

EXAMPLE 2

37.2 parts of isobutylamino acetic acid diethylamide are dissolved in 100 parts by volume of benzene and under cooling and stirring 16.3 parts of diethyl oxamine acid chloride are dropwise added thereto. After a stirring for 2 hours the isobutylamino acetic acid diethyl amide hydrochloride thus formed is filtered by suction and the N-diethyl oxaminoyl isobutylamino acetic acid diethylamide is purified and distilled, as described in Example 1. Its boiling point at 0.16 mm. pressure amounts to 174°–175° C. This product is miscible with water, alcohol, ether and the like.

EXAMPLE 3

31.2 parts of cyclohexylamino acetic acid diethyl amide are dissolved in 150 parts by volume of ether and, while stirring and cooling, the mixture is treated dropwise with 11 parts of diethyl oxamic acid chloride. Stirring is still continued for several hours, whereupon the whole is worked up, in the manner described in Example 1. Boiling point at 0.1 mm. pressure=200°–203° C.; melting point 80°–81° C. The substance is a little soluble in water and easily soluble in organic solvents.

Analogous cyclopentyl compounds may be produced in exactly the same manner. The N-dimethyl oxaminoyl cyclo pentyl amino acetic acid diethylamide boils at 175°–176° C., when distilled at a pressure of 0.1 mm. It is readily soluble in water and organic solvents.

In the following Table 1 further compounds obtainable according to the above examples and having the general formula

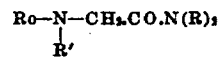

$Ro=CH_3$ for the Examples 1 and 2.
$Ro=C_2H_5$ for the Examples 3 to 14.

of the Table 1 are enumerated.

Table 1

| No. | R | R' | B. P., mm. | form | solubility in: w=water, e=ether |
|---|---|---|---|---|---|
| 1 | $CH_3$ | $-COCH_3$ | 133° C. (0.15) | Solid, M. P. 50°–52° C. | w: miscible, e: miscible. |
| 2 | $C_2H_5$ | do | 128° C. (0.05) | liquid | Do. |
| 3 | $CH_3$ | do | 145°–147° C. (0.5) | do | Do. |
| 4 | $C_2H_5$ | do | 136°–137° C. (0.15) | do | Do. |
| 5 | $CH_3$ | $COCH_2CH(CH_3)_2$ | 116°–117° C. (0.2) | do | Do. |
| 6 | $C_2H_5$ | do | 132°–133° C. (0.14) | do | w: easily soluble, e: easily soluble |
| 7 | do | $COC(CH_3)_3$ | 124° C. (0.15) | Solid, M. P. 61°–62° C. | Do. |
| 8 | $CH_3$ | $COCH(C_2H_5)_2$ | 120°–122° C. (0.07) | liquid | w: miscible, e: miscible. |
| 9 | do | $CO.CON(C_2H_5)_2$ | 159°–161° C. (0.18) | do | Do. |
| 10 | $C_2H_5$ | $CON(C_2H_5)_2$ | 139°–140° C. (0.33) | do | Do. |
| 11 | do | $-COCH=C(Cl)(CH_3)$ | 152°–153° C. (0.15) | do | w=soluble. |
| 12 | do | $CO-C_6H_3(OCH_3)_2$ | 208°–210° C. (0.3) | do | w=easily soluble, e=easily soluble. |

Table 1—Continued

| No. | R | R' | B. P., mm. | form | solubility in: w=water, e=ether |
|---|---|---|---|---|---|
| 13 | C₂H₅ | CO–⟨phenyl⟩–OCOCH₃ | 185°–188° C. (0.25) | liquid | w=easily soluble, e=easily soluble. |
| 14 | do | COC(CH₃)=C–CH, CH₃C(=O)–O (isoxazole/pyranone ring) | 212°–215° C. (0.5) | solid, M. P. 105° C. | Do. |
| 15 | do | COC—C.CH₃, CH₃C—N–O | 170°–172° C. (0.6) | solid, M. P. 74° C. | Do. |
| 16 | CH₃ | —COCH₂—⟨phenyl⟩ | 195°–197° C. (0.3) | liquid | w=soluble, e=easily soluble. |

EXAMPLE 4

39.6 parts of α-methylamino propionic acid diethyl amide are dissolved in 100 parts by volume of benzene, then 13.4 parts of dimethyl carbamic acid chloride in 50 parts by volume of benzene are added thereto and the whole is heated in the autoclave during 3 hours to 120° C. After cooling the separated hydrochloride is filtered off and the compound is purified as described in Example 1. Boiling point at 0.15 mm. pressure=117° C. It is miscible with water and organic solvents.

Further compounds having the general formula:

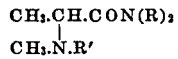

and obtainable, when working in the manner described in this example, are enumerated in the following Table 2.

Table 2

| No. | R | R' | B. P., mm. | form | solubility in: w=water, e=ether |
|---|---|---|---|---|---|
| 1 | CH₃ | —COCH₃ | 103°–105° C. (0.04) | liquid | w=miscible, e=miscible. |
| 2 | C₂H₅ | do | 101°–103° C. (0.2) | do | Do. |
| 3 | CH₃ | —COCH=CH.CH₃ | 136°–137° C. (0.07) | do | Do. |
| 4 | C₂H₅ | do | 117°–118° C. (0.015) | do | Do. |
| 5 | do | COCH₂CH₂CH₂CH₃ | 124°–125° C. (0.17) | do | w=easily soluble, e=easily soluble. |
| 6 | do | COCH₂CH(CH₃)₂ | 120°–122° C. (0.4) | do | Do. |
| 7 | do | do | 135°–138° C. (0.3) | do | w=moderately soluble, e=easily soluble. |
| 8 | CH₃ | —COC(CH₃)₃ | 106°–108° C. (0.05) | do | w=easily soluble, e=easily soluble. |
| 9 | C₂H₅ | COC(CH₃)₃ | 108°–110° C. (0.25) | do | Do. |
| 10 | CH₃ | —COCH₂C(CH₃)₃ | 119° C. (0.19) | do | Do. |
| 11 | C₂H₅ | do | 118°–120° C. (0.2) | do | w=soluble, e=soluble. |
| 12 | CH₃ | —COCH=C(CH₃)(Cl) | 132°–134° C. (0.15) | do | w=easily soluble, e=easily soluble. |
| 13 | do | —COCH₂.CH₂.C≡CH | 135°–136° C. (0.1) | do | w=miscible, e=miscible. |

EXAMPLE 5

86 parts of α-ethylamino propionic acid diethyl amide (made according to the method described in Example 1, having the boiling point 105°–107° C. at 11 mm. pressure and being miscible with water as well as with organic solvents) are dissolved in 300 parts by volume of dry ether and treated dropwise under cooling with 30 parts of isovalerianic acid chloride. After some time the hydrochloride precipitated is filtered off, then the filtrate is freed from the benzene and purified, if necessary; finally, it is distilled in high-vacuo.

Boiling point at 0.15 mm. pressure = 129°–130° C.; the product is soluble in water and organic solvents.

The following table contains the indications for further compounds according to the general formula

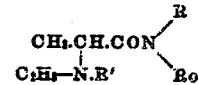

*Table 3*

| No. | N(R/Ro) | R' | B. P., mm. | form | solubility in: w=water, e=ether |
|---|---|---|---|---|---|
| 1 | N(C₂H₅)₂ | COCH₂CH₂CH₃ | 114°–115° C. (0.05) | liquid | w=miscible, e=miscible. |
| 2 | N(CH₃)₂ | –COCH=CH.CH₃ | 123°–125° C. (0.11) | do | w=easily soluble, e=easily soluble. |
| 3 | N(CH₃)(C₂H₅) | ...do... | 133°–135° C. (0.05) | do | Do. |
| 4 | N(C₂H₅)₂ | COCH=CH.CH₃ | 120°–123° C. (0.17) | do | w=miscible, e=miscible. |
| 5 | N(CH₂–CH₂)₂O (morpholino) | –COCH=CH.CH₃ | 156°–158° C. (0.02) | do | w=easily soluble, e=easily soluble. |
| 6 | N(C₂H₅)₂ | COCH₂CH₂CH₂CH₃ | 122°–123° C. (0.1) | do | Do. |
| 7 | N(CH₃)₂ | COCH₂CH(CH₃)₂ | 113°–115° C. (0.13) | do | w=miscible, e=miscible. |
| 8 | N(C₂H₅)₂ | ...do... | 130°–132° C. (0.2) | do | w=little soluble, e=easily soluble. |
| 9 | N(CH₂–CH₂)₂O | –COCH₂CH(CH₃)₂ | 155°–157° (0.26) | do | w=easily soluble, e=easily soluble. |
| 10 | N(CH₃)₂ | COCH=C(CH₃)₂ | 128° C. (0.1) | do | w=miscible, e=easily soluble. |
| 11 | N(CH₃)(C₂H₅) | –COCH=C(CH₃)₂ | 131°–134° C. (0.1) | do | w=easily soluble, e=easily soluble. |
| 12 | N(C₂H₅)₂ | COCH=C(CH₃)₂ | 122°–123° C. (0.22) | do | w=miscible, e=miscible. |
| 13 | N(CH₃)₂ | COC(CH₃)₃ | 114°–116° C. (0.1) | do | w=easily soluble, e=easily soluble. |
| 14 | N(CH₃)(C₂H₅) | –COC(CH₃)₃ | 112°–113° C. (0.03) | do | Do. |
| 15 | N(C₂H₅)₂ | COC(CH₃)₃ | 122° C. (0.13) | do | w=soluble, e=soluble. |
| 16 | N(CH₃)₂ | –COCH=CH–CH=CH.CH₃ | 165°–168° C. (0.45) | do | w=easily soluble, e=easily soluble. |
| 17 | N(C₂H₅)₂ | ...do... | 156°–158° C. (0.7) | do | w=little soluble, e=easily soluble. |
| 18 | N(CH₃)₂ | –COCH₂CH(CH₃)(C₂H₅) | 121°–122° C. (0.15) | do | w=easily soluble, e=easily soluble. |
| 19 | N(C₂H₅)₂ | COC=C(CH₃)(CH₃) with CH₃ | 118°–120° C. (0.09) | do | w=soluble, e=soluble. |

2,447,587

*Table 3—Continued*

| No. | N⟨R,Ro | R' | B. P., mm. | form | solubility in: w=water, e=ether |
|---|---|---|---|---|---|
| 20 | N(CH₃)₂ | —COCH(C₂H₅)₂ | 123°–125° C. (0.25) | liquid | w=easily soluble, e=easily soluble. |
| 21 | do | —COCH₂C(CH₃)₃ | 110°–112° C. (0.03) | do | Do. |
| 22 | N(C₂H₅)₂ | do | 136°–137° C. (0.3) | do | w=moderately soluble, e=easily soluble. |
| 23 | N(CH₃)₂ | —COCH=C(Cl)(CH₃) | 119°–121° C. (0.01) | do | w=easily soluble, e=easily soluble. |
| 24 | N(C₂H₅)₂ | COCH=C(CH₃)(Cl) | 137°–138° C. (0.2) | do | w=little soluble, e=easily soluble. |
| 25 | do | COOC₂H₅ | 117°–118° C. (0.5) | do | Do. |
| 26 | do | CON(C₂H₅)₂ | 127°–130° C. (0.19) | do | w=miscible, e=miscible. |
| 27 | do | CO.CON(C₂H₅)₂ | 146°–147° C. (0.08) | do | Do. |
| 28 | do | —COCH(CH₃)(OCH₂CH₃) | 134°–135° C. (0.2) | do | w=easily soluble, e=easily soluble. |
| 29 | do | —COCH(CH₃)(OCH₂CH₂CH₃) | 130°–132° C. (0.08) | do | Do. |
| 30 | do | —COCH(CH₃)(OCH(CH₃)₂) | 136°–137° C. (0.12) | do | Do. |
| 31 | do | —COCH(C₂H₅)(OC₂H₅) | 135° C. (0.25) | do | w=soluble, e=soluble. |
| 32 | N(CH₃)₂ | —COCH(CH₃)(SCH₂CH₂CH₃) | 142°–143° C. (0.2) | do | Do. |
| 33 | do | —COC(CH₃)₂(SCH₂CH₂CH₃) | 180°–182° C. (0.4) | do | w=moderately soluble, e=easily soluble. |
| 34 | do | CO—C₆H₅ | 142°–144° C. (0.35) | do | w=soluble, e=soluble. |
| 35 | N(C₂H₅)₂ | CO—C₆H₃(OCH₃)₂ | 198°–200° C. (0.1) | do | w=soluble, e=easily soluble. |
| 36 | N(CH₃)₂ | —COCH(CH₂—CH₂—O—CH₂—CH₂) | 155°–157° C. (0.13) | do | w=soluble, e=soluble. |
| 37 | N(C₂H₅)₂ | do | 156°–157° C. (0.15) | do | Do. |
| 38 | do | CO—pyridyl | 163°–165° C. (0.15) | do | w=easily soluble, e=easily soluble. |
| 39 | do | COC=C(CH₃)—N=C(CH₃)—O (isoxazole) | 170°–172° C. (0.4) | do | Do. |
| 40 | N(CH₃)₂ | —COC≡C—CH(CH₃)₂ | 132°–134° C. (0.09) | do | Do. |
| 41 | do | COCH(CH₂—CH₂)₂CH.CH₃ | 145°–146° C. (0.2) | do | w=moderately soluble, e=moderately soluble. |

Table 3—Continued

| No. | N⟨R/Ro⟩ | R' | B. P., mm. | form | solubility in: w=water, e=ether |
|---|---|---|---|---|---|
| 42 | N(CH₃)₂ | —COCH=CH— 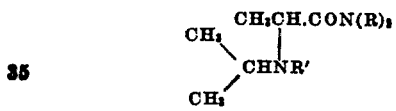  (with OCH₃, OCH₃ substituents) | 205°–206° C. (0.4) | liquid | w=soluble, e=easily soluble. |
| 43 | ...do | —COC₂H₅ | 129°–132° C. (0.3) | ...do | w=soluble, e=soluble. |

Example 6

31.6 parts of α-propylamino propionic acid dimethyl amide (made according to Example 1 or by catalytical reduction of α-allylamino propionic acid dimethyl amide) B. P. 15 mm. 110°–112° C., are dissolved in 150 parts of ether. Then 13.9 parts of β-chlorocrotonic acid chloride are allowed to drop thereinto under cooling. The working up of the mixture is carried out, as mentioned in Example 1, the final product having then a boiling point of 120°–122° C. at 0.1 mm. pressure and being soluble in water and organic solvents.

Further compounds according to the general formula $$\text{CH}_3\text{CH.CON(R)}_2$$
$$|\;\;\;\;\;\;\;\;\;\;\;\;\;\;\;\;$$
$$\text{CH}_3\text{CH}_2\text{CH}_2\text{NR'}$$

are shown in the following table.

Example 7

31.6 parts of α-isopropylamino propionic acid dimethyl amide (B. P. 15 mm. 90°–92° C. prepared according to Example 1) are dissolved in ether and treated under stirring at 0° C. with 10.4 parts of crotonic acid chloride; then stirring of the mixture is continued for some hours at the cold, whereupon the hydrochloride thus precipitated is filtered off and the substance rectified in the high vacuo. Boiling point at 0.1 mm. pressure=121°–122° C; melting point 82°–85° C. This product is easily soluble in water and organic solvents.

In the table 5 further compounds of the following general formula are enumerated $$\text{CH}_3\;\;\;\;\;\;\;\text{CH}_3\text{CH.CON(R)}_2$$
$$\;\;\;\;\diagdown\;\;\;\;|$$
$$\;\;\;\;\;\;\;\;\text{CHNR'}$$
$$\;\;\;\;\diagup$$
$$\text{CH}_3$$

Table 4

| No. | R | R' | B. P., mm. | form | solubility in: w=water, e=ether |
|---|---|---|---|---|---|
| 1 | CH₃ | —COCH=CH.CH₃ | 129°–131° C. (0.1) | liquid | w=easily soluble, e=easily soluble. |
| 2 | C₂H₅ | ...do | 136°–138° C. (0.25) | ...do | w=moderately soluble, e=easily soluble. |
| 3 | ...do | —COCH.CH₃ <br> \|<br> OC₂H₅ | 125° C. (0.2) | ...do | w=soluble, e=soluble. |
| 4 | CH₃ | —COC₂H₅ | 129°–132° C. (0.3) | ...do | w=easily soluble, e=easily soluble. |
| 5 | ...do | —COCH₂CH₂CH₃ | 126°–129° C. (0.15) | ...do | Do. |
| 6 | ...do | —COCH₂CH₂CH₂CH₃ | 140°–142° C. (0.2) | ...do | Do. |
| 7 | ...do | —COCH₂—CH⟨CH₃/CH₃⟩ | 128°–131° C. (0.15) | ...do | Do. |
| 8 | ...do | —COC(CH₃)(CH₃)—CH₃ | 122°–125° C. (0.24) | ...do | Do. |
| 9 | ...do | —COCH=C⟨CH₃/CH₃⟩ | 132° C. (0.15) | ...do | Do. |
| 10 | ...do | —COC(CH₃)=C⟨CH₃/CH₃⟩ | 138°–141° C. (0.3) | ...do | Do. |
| 11 | ...do | —COCH=C⟨Cl/CH₃⟩ | 120°–122° C. (0.1) | ...do | w=moderately soluble, e=easily soluble. |

Table 5

| No. | R | R' | B. P., mm. | form | solubility in: w=water, e=ether |
|---|---|---|---|---|---|
| 1 | C₃H₅ | —COCH₃ | 113° C. (0.04) | liquid | w=soluble, e=soluble. |
| 2 | do | —COCH=CH.CH₃ | 138° C. (0.02) | waxy | Do. |
| 3 | do | —COCH=C(CH₃)(CH₃) | 142°–144° C. (0.25) | liquid | w=little soluble, e=easily soluble. |
| 4 | CH₃ | —COCH.CH₃ / OC₂H₅ | 131°–133° C. (0.2) | do | w=soluble, e=soluble. |

Example 8

27.6 parts of α-allylamino propionic acid diethyl amide (made according to Example 1, boiling point at 12 mm. pressure = 127°–129° C.) are dissolved in 100 parts by volume of ether and dropwise treated with 8 parts of isovalerianic acid chloride under cooling. The working up is carried out like that of Example 1; boiling point at 0.06 mm. pressure = 118°–120° C. This product is moderately soluble in water, but easily soluble in ether.

In the Table 6 further compounds of the following general formula are mentioned.

CH₃.CHCON(R)₂
  |
C₃H₅—N.R' mentioned in Example 1, boiling at 12 mm. pressure at 125°–130° C. and miscible with water and organic solvents) are dissolved in 150 parts by volume of dry ether. Then, while stirring and cooling, 11.8 parts of dimethyl acroyl chloride are dropped thereinto. After some time there is filtered and worked up. Boiling point at 0.07 mm. pressure = 140°–142° C.

This product is moderately soluble in water, but easily soluble in organic solvents.

Table 6

| No. | R | R' | B. P., mm. | form | solubility in: w=water, e=ether |
|---|---|---|---|---|---|
| 1 | CH₃ | —COCH=CH.CH₃ | 127°–128° C. (0.05) | liquid | w=easily soluble, e=easily soluble. |
| 2 | C₃H₅ | do | 133° C. (0.03) | do | Do. |
| 3 | CH₃ | —COCH₂CH₂CH₂CH₃ | 120°–121° C. (0.1) | do | Do. |
| 4 | do | —COCH₂—CH(CH₃)(CH₃) | 122°–124° C. (0.27) | do | Do. |
| 5 | do | —COCH=C(CH₃)(CH₃) | 122°–124° C. (0.1) | do | Do. |
| 6 | C₃H₅ | do | 131°–132° C. (0.15) | do | Do. |
| 7 | do | —CO.CON(C₂H₅)₂ | 169°–170° C. (0.08) | do | w=soluble, e=soluble. |

Example 9

40 parts of α-n-butylamino propionic acid diethyl amide (made according to the method Further compounds according to the following general formula are enumerated in the Table 7.

CH₃CH.CON(R)₂
   |
CH₃CH₂CH₂CH₂N.R'

Table 7

| No. | R | R' | B. P., mm. | form | solubility in: w=water, e=ether |
|---|---|---|---|---|---|
| 1 | CH₃ | —COCH=CH.CH₃ | 135°–137° C. (0.12) | liquid | w=easily soluble, e=easily soluble. |
| 2 | C₂H₅ | do | 141°–143° C. (0.13) | do | w=moderately soluble, e=easily soluble. |
| 3 | CH₃ | —CH₂CH(CH₃)(CH₃) | 126°–127° C. (0.1) | do | w=easily soluble, e=easily soluble. |
| 4 | C₂H₅ | —CO.CON(CH₃)₂ | 180°–182° C. (0.35) | do | w=soluble, e=soluble. |
| 5 | CH₃ | —CO.CONH(C₂H₅)₂ | 180°–182° C. (0.35) | do | w=easily soluble, e=easily soluble. |
| 6 | C₂H₅ | —CO.CON(C₂H₅)₂ | 164°–166° C. (0.08) | do | w=moderately soluble, e=easily soluble. |
| 7 | CH₃ | —COC₂H₅ | 134° C. (0.22) | do | w=soluble, e=soluble. |

Example 10

30 parts of secondary α-butylamino propionic acid diethyl amide (made according to Example 1; boiling point at 11 mm. pressure=112°–115° C., miscible with water and organic solvents) are dissolved in 150 parts by volume of ether and then 8 parts of dimethyl acryl chloride are added dropwise under cooling and stirring. The working up and purification takes place analogously to Example 1; boiling point at 0.3 mm. pressure=135°–137° C. This compound is soluble in water and easily soluble in ether.

Example 10A 19.8 parts of α-cyclohexylamino propionic acid dimethyl amide, B. P. at 12 mm. pressure=162°–164° C. (made according to Example 1, miscible with water and organic solvents) are dissolved in 150 parts of ether and dropwise treated, under cooling and stirring, with 4.7 parts of propionyl chloride. The working up and purification is carried out in an analogous manner to that described in Example 1. The compound boils at a 0.1 mm. pressure at 165°–167° C. and is moderately soluble in water and easily soluble in organic solvents.

When starting from α-cyclopentylamino propionic acid dimethyl amide, one obtains in an analogous manner N-propionyl-α-cyclopentyl-amino propionic acid dimethyl amide boiling at 0.2 mm. pressure at 169°–171° C. The substance thus obtained is easily soluble in water and in organic solvents.

Further compounds of the general formula

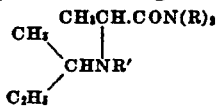

are identified in Table 8.

Table 8

| No. | R | R' | B. P., mm. | form | solubility in: w=water, e=ether |
|---|---|---|---|---|---|
| 1 | CH₃ | —COCH=CH.CH₃ | 144°–146° C. (0.5) | liquid | w=easily soluble, e=easily soluble. |
| 2 | do | —COCH₂CH(CH₃)₂ | 129°–131° C. (0.25) | do | Do. |
| 3 | do | —COCH=C(CH₃)₂ | 149°–151° C. (0.45) | do | Do. |
| 4 | C₂H₅ | —COCON(C₂H₅)₂ | 175°–177° C. (0.2) | do | w=moderately soluble, e=easily soluble. |

Example 11

34.3 parts of β-ethylamino propionic acid diethyl amide (prepared like ethylamino acetic acid diethyl amide, cf. Example 1; boiling point at 13 mm. pressure=124°–127° C., miscible with water and organic solvents) are dissolved in 100 parts by volume of toluene; then, while well cooling, 12 parts of trimethyl acetic acid chloride are added dropwise and the whole is stirred for some time at room temperature. The working up is carried out in an analogous manner to that described in Example 1; boiling point at 0.17 mm. pressure=131°–133° C. The final product is easily soluble in water and in organic solvents.

The following Table 9 contains further compounds according to the general formula

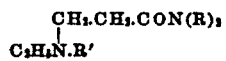

Table 9

| No. | R | R' | B. P., mm. | form | solubility in: w=water, e=ether |
|---|---|---|---|---|---|
| 1 | C₂H₅ | COCH=CH.CH₃ | 166° C. (0.07) | liquid | w=easily soluble, e=easily soluble. |
| 2 | CH₂.CH=CH₂ | COCH₂CH(CH₃)₂ | 155°–156° C. (0.08) | do | w=moderately soluble, e=easily soluble. |
| 3 | C₂H₅ | COC=C(CH₃)₂ | 148°–150° C. (0.1) | do | w=easily soluble, e=easily soluble. |
| 4 | C₂H₅ | CO.CON(C₂H₅)₂ | 166° C. (0.07) | do | Do. |
| 5 | do | CO—C₆H₃(OCH₃)₂ | 207°–210° C. (0.08) | do | w=10% soluble, e=easily soluble. |
| 6 | do | CO—C₆H₄—CH₂COO— | 217°–220° C. (0.45) | do | Do. |
| 7 | do | CO—pyridyl | 178°–180° C. (0.21) | do | w=easily soluble, e=easily soluble. |
| 8 | do | COC—C.CH₃ (isoxazole, CH₃C, N, O) | 184°–185° C. (0.18) | do | Do. |

EXAMPLE 12

27.6 parts of β-allylamino propionic acid diethyl amide (made in the manner described in Example 1, B. P. 12 mm. 127°–130° C., miscible with water and organic solvents) are dissolved in ether and treated below 0° C. with 8 parts of dimethyl acroyl chloride. The purification and working up is carried out, as described in Example 1, the final product boiling then at 140–143° C., when distilled at a pressure of 0.2 mm., and being moderately soluble in water and easily soluble in organic solvents.

The analogously prepared N-diethyl oxamic acid compound possesses the boiling point 168°–169° C. at 0.12 mm. pressure.

1, boiling point at 12 mm. pressure=106°–108° C., miscible with water and organic solvents) are dissolved in ether. while adding 50 parts by volume of dry pyridine, and treated dropwise under stirring and cooling with 23.7 parts of dimethyl acroyl chloride. After the filtration of the pyridine hydrochloride the filtrate is purified and rectified in the high vacuo, as described in Example 1. Boiling point at 0.15 mm. pressure= 120°–122° C.; soluble in water and organic solvents.

Compounds of the general formula

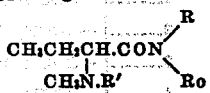

are mentioned in the following table.

Table 10

| No. | N⟨R, Ro | R' | B. P., mm. | form | solubility in: w=water, e=ether |
|---|---|---|---|---|---|
| 1 | N(CH₃)₂ | —COCH=CH.CH₃ | 132°–134° C. (0.03) | liquid | w=easily soluble, e=easily soluble. |
| 2 | N⟨CH₃, C₂H₅ | ....do.... | 120°–122° C. (0.06) | ....do.... | Do. |
| 3 | N(C₂H₅)₂ | ....do.... | 128°–130° C. (0.09) | ....do.... | Do. |
| 4 | ....do.... | COCH⟨CH₃, CH₃ | 127°–129° C. (0.9) | ....do.... | w=miscible, e=miscible. |
| 5 | N(CH₃)₂ | —COCH₂CH⟨CH₃, CH₃ | 117°–119° C. (0.01) | ....do.... | w=easily soluble, e=easily soluble. |
| 6 | N⟨CH₃, C₂H₅ | ....do.... | 111°–113° C. (0.04) | ....do.... | Do. |
| 7 | N(C₂H₅)₂ | COCH₂CH⟨CH₃, CH₃ | 121°–122° C. (0.15) | ....do.... | w=moderately soluble, e=easily soluble. |
| 8 | N(C₂H₅)₂ | COCH=C⟨CH₃, CH₃ | 128°–130° C. (0.2) | ....do.... | Do. |
| 9 | N(C₂H₅)₂ | COC⟨CH₃, CH₃, CH₃ | 110°–112° C. (0.25) | ....do.... | w=soluble, e=easily soluble. |
| 10 | ....do.... | —COCH=C⟨CH₃, Cl | 134° C. (0.13) | ....do.... | w=little soluble, e=easily soluble. |
| 11 | ....do.... | COCON(C₂H₅)₂ | 158°–159° C. (0.16) | ....do.... | w=easily soluble, e=easily soluble. |
| 12 | ....do.... | CO—C₆H₃(OCH₃)(OCH₃) | 203°–205° C. (0.08) | ....do.... | w=little soluble, e=easily soluble. |
| 13 | N(CH₃)₂ | —CO—C⟨CH₃, CH₃, SCH₂CH₃ | 159°–160° C. (0.35) | ....do.... | Do. |

The β-allylamino propionic acid dimethyl amide acylated by means of isovalerianic acid boils at a pressure of 0.2 mm. at 125°–128° C.

EXAMPLE 13

34.3 parts of α-methylamino-n-butyric acid diethyl amide (preparation according to Example

EXAMPLE 14

31.6 parts of α-ethylamino butyric acid dimethyl amide, boiling point at 12 mm. pressure=100°–101° C., miscible with water and organic solvents, are dissolved in 200 parts by volume of ether, whereupon 12 parts of isovalerianic acid chloride are caused to drop thereinto under stirring and cooling. After a stirring for 2 hours the ethylamino butyric acid dimethylamide hydrochloride is filtered off and the reaction product purified and fractionated in high vacuo in the manner described in Example 1. The final product has the boiling point 121°–124° C. at 0.1 mm. pressure and is easily soluble in water and organic solvents.

The Table 11 contains further compounds according to the general formula $$CH_3CH_2CH.CON(CH_3)_2$$
$$CH_3CH_2N.R'$$

Table 11

| No. | R' | B. P., mm. | form | solubility in: w=water, e=ether |
|---|---|---|---|---|
| 1 | —COCH₃ | 126°–127° C. (0.6) | liquid | w=easily soluble, e=easily soluble. |
| 2 | —COCH₂CH₃ | 124°–126° C. (0.45) | do | Do. |
| 3 | —COCH₂CH₂CH₃ | 117° C. (0.2) | do | Do. |
| 4 | —COCH=CH.CH₃ | 132°–134° C. (0.03) | do | Do. |
| 5 | —COCH(CH₃)₂ | 100°–102° C. (0.25) | do | Do. |
| 6 | CO(CH₂)₃CH₃ | 128°–129° C. (0.1) | do | w=soluble. |
| 7 | COCH=C(CH₃)₂ | 128° C. (0.1) | do | w=easily soluble, e=easily soluble. |
| 8 | —COC(CH₃)₃ | 134°–136° C. (0.55) | do | Do. |
| 9 | —COCH₂CH₂CH₂CH₂CH₃ | 126°–128° C. (0.03) | do | w=moderately soluble, e=easily soluble. |
| 10 | COCH=CH—CH=CH.CH₃ | 145° C. (0.35) | waxy | w=little soluble, e=soluble. |
| 11 | —COCH(C₂H₅)₂ | 122°–124° C. (0.02) | liquid | w=moderately soluble, e=easily soluble. |
| 12 | —COCH₂CH(CH₃)(C₂H₅) | 143°–144° C. (0.5) | do | w=soluble, e=easily soluble. |
| 13 | —COCH₂C(CH₃)₃ | 122°–124° C. (0.08) | do | Do. |
| 14 | COCH(CH₃)—CH(CH₃)₂ | 125° C. (0.2) | do | w=soluble, e=soluble. |
| 15 | COC(CH₃)=C(CH₃)₂ | 125°–126° C. (0.17) | do | w=easily soluble, e=easily soluble. |
| 16 | CO(CH₂)₅CH₃ | 132°–134° C. (0.2) | do | w=soluble, e=soluble. |
| 17 | CO.CON(C₂H₅)₂ | 155° C. (0.1) | do | w=miscible, e=miscible. |
| 18 | —COCH=C(CH₃)(Cl) | 131°–133° C. (0.09) | do | w=soluble, e=easily soluble. |
| 19 | —COCH(CH₃)(OC₂H₅) | 124° C. (0.1) | do | w=easily soluble, e=easily soluble. |
| 20 | —COCH(CH₂CH₃)(OCH₃) | 125°–126° C. (0.1) | do | Do. |
| 21 | —COCH(CH₃)(OCH₂CH₂CH₃) | 132°–134° C. (0.2) | do | Do. |
| 22 | —COCH(CH₃)(OCH(CH₃)₂) | 132°–133° C. (0.03) | do | Do. |

Table 11—Continued

| No. | R' | B. P., mm. | form | solubility in: w=water, e=ether |
|---|---|---|---|---|
| 23 | —COCH.C₂H₅<br>O.C₂H₅ | 143°–145° C. (0.3) | liquid | w=easily soluble, e=easily soluble. |
| 24 | —COCH.CH₃<br>SCH₃ | 144°–145° C. (0.1) | do | w=soluble, e=soluble. |
| 25 | —COCH.CH₃<br>SC₂H₅ | 150° C. (0.17) | do | w=moderately soluble, e=easily soluble. |
| 26 | —COCH.CH₂CH₃<br>SCH₃ | 160°–162° C. (0.4) | do | w=little soluble, e=easily soluble. |
| 27 | —COCH⟨CH₂—CH₂\O\CH₂—CH₂⟩ | 157° C. (0.13) | do | w=easily soluble, e=easily soluble. |
| 28 | —COC≡C.CH₃ | 140°–141° C. (0.35) | do | Do. |
| 29 | —COC⟨CH₃\CH₃\OCH₂CH₂CH₃⟩ | 134°–136° C. (0.1) | do | w=soluble, e=soluble. |

EXAMPLE 15

372 parts of α-ethylamino-n-butyric acid diethyl amide (preparation according to Example 1; boiling point 15 mm. pressure=111°–114° C.; miscible with water and organic solvents) are dissolved in 1000 parts by volume of absolute ether, then the mixture is well cooled and treated dropwise under stirring with 163.5 parts of diethyl oxamic acid chloride. After a stirring for 2 hours the ethylamino butyric acid diethyl amide hydrochloride is filtered off and purified, as described in Example 1. After a repeated distillation in high vacuo (boiling point 165°–168° C. at 0.07 mm. pressure) an almost colourless oil is obtained which is readily soluble in water and organic solvents.

The following table 12 shows an enumeration of further compounds according to the general formula

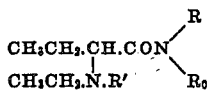

Table 12

| No. | N⟨R\R₀⟩ | R' | B. P., mm. | form | solubility in: w=water, e=ether |
|---|---|---|---|---|---|
| 1 | N(C₂H₅)₂ | COCH₃ | 107°–108° C. (0.08) | liquid | w=miscible, e=miscible. |
| 2 | N(C₂H₅)₂ | do | 124° C. (0.05) | do | w=moderately soluble. e=easily soluble. |
| 3 | N(C₂H₅)₂ | COCH₂CH₃ | 115° C. (0.1) | do | w=miscible, e=miscible. |
| 4 | N⟨CH₃\C₃H₅⟩ | —COCH₂CH₂CH₃ | 126°–127° C. (0.1) | do | w=soluble, e=soluble. |
| 5 | N⟨CH₂CH₂\O\CH₂CH₂⟩ | do | 140°–142° C. (0.11) | do | w=easily soluble, e=easily soluble. |
| 6 | N⟨CH₃\C₂H₅⟩ | —COCH=CH.CH₃ | 116°–118° C. (0.03) | do | Do. |
| 7 | N(C₂H₅)₂ | COCH=CH.CH₃ | 136°–138° C. (0.3) | do | Do. |
| 8 | N(C₂H₅)₂ | —COCH=CH.CH₃ | 130°–132° C. (0.1) | do | w=moderately soluble, e=easily soluble. |
| 9 | N⟨CH₂—CH₂\O\CH₂—CH₂⟩ | do | 155°–158° C. (0.04) | do | w=easily soluble, e=easily soluble. |
| 10 | N(C₂H₅)₂ | COCH⟨CH₃\CH₃⟩ | 105° C. (0.17) | do | w=miscible, e=miscible. |
| 11 | do | COCH₂CH₂CH₂CH₃ | 124°–126° C. (0.1) | do | w=moderately soluble, e=easily soluble. |

Table 12—Continued

| No. | N⟨R/R0⟩ | R' | B. P., mm. | form | solubility in: w=water, e=ether |
|---|---|---|---|---|---|
| 12 | N⟨CH₂-CH₂/CH₂-CH₂⟩O (morpholino) | —COCH₂CH₂CH₂CH₃ | 153° C. (0.08). | liquid | w=moderately soluble, e=easily soluble. |
| 13 | N⟨CH₃/C₂H₅⟩ | —COCH₂—CH⟨CH₃/CH₃⟩ | 114°–115° C. (0.1). | do | Do. |
| 14 | N⟨CH₂-CH₂/CH₂-CH₂⟩O | —COCH₂CH⟨CH₃/CH₃⟩ | 144°–146° C. (0.2). | do | Do. |
| 15 | N⟨CH₂CH₂CH₃/CH₂CH₂CH₃⟩ | COCH₂CH⟨CH₃/CH₃⟩ | 126°–128° C. (0.1). | do | w=little soluble, e=easily soluble. |
| 16 | N⟨CH₃/C₂H₅⟩ | —COCH=C⟨CH₃/CH₃⟩ | 125°–126° C. (0.1). | do | w=easily soluble, e=easily soluble. |
| 17 | N(C₂H₅)₂ | COCH=C⟨CH₃/CH₃⟩ | 130° C. (0.17) | do | w=5% soluble, e=easily soluble. |
| 18 | N⟨CH₂CH₂CH₃/CH₂CH₂CH₃⟩ | do | 145° C. (0.2) | do | w=difficultly soluble, e=easily soluble. |
| 19 | N⟨CH₂CH₃/CH₂CH₃⟩CH₃ | do | 154°–155° C. (0.06). | do | Do. |
| 20 | N⟨CH₂-CH₂/CH₂-CH₂⟩O | —COCH=C⟨CH₃/CH₃⟩ | 158°–160° C. (0.35). | solid, M. P. 50°–51° C. | w=easily soluble, e=easily soluble. |
| 21 | N⟨C₂H₅/C₂H₅⟩ | —COCH=CH—CH=CH.CH₃ | 146°–148° C. (0.15). | liquid | w=little soluble, e=easily soluble. |
| 22 | N⟨CH₂-CH₂/CH₂-CH₂⟩O | do | 165°–167° C. (0.12). | waxy | Do. |
| 23 | N(C₂H₅)₂ | COCH—CH⟨CH₃/CH₃⟩ with CH₃ | 125°–126° C. (0.12). | liquid | Do. |
| 24 | do | COC=C⟨CH₃/CH₃⟩ with CH₃ | 121°–122° C. (0.09). | do | Do. |
| 25 | N⟨CH₂-CH₂/CH₂-CH₂⟩O | —COCH₂—C(CH₃)₂—CH₃ | 149° C. (0.02) | do | Do. |
| 26 | N(C₂H₅)₂ | CO.COOC₂H₅ | 140° C. (0.3) | do | w=difficultly soluble, e=easily soluble. |
| 27 | do | COCON(CH₃)₂ | 169°–171° C. (0.3). | do | w=miscible, e=miscible. |
| 28 | N(C₂H₅)₂ | do | 170° C. (0.12). | do | w=soluble, e=easily soluble. |
| 29 | N(C₂H₅)₂ | CON(C₂H₅)₂ | 115°–117° C. (0.05). | do | w=easily soluble, e=easily soluble. |
| 30 | N⟨CH₂-CH₂/CH₂-CH₂⟩CH₂ (piperidino) | —COCON(C₂H₅)₂ | 195°–196° C. (0.65). | solid, M. P. 82° C. | w=little soluble, e=easily soluble. |
| 31 | C₂H₅\N—CH⟨CH₂-CH₂/CH₂CH⟩CH₃ | CO.CON(C₂H₅)₂ | 188°–190° C. (0.05). | liquid | Do. |

Table 12—Continued

| No. | N⟨R, R⁰⟩ | R' | B. P., mm. | form | solubility in: w=water, e=ether |
|---|---|---|---|---|---|
| 32 | N(C₂H₅)₂ | COCH=C(CH₃)(Cl) | 134° C. (0.15). | liquid | w=little soluble e=easily soluble. |
| 33 | N(CH₃)(C₂H₅) | —COCH.CH₃ (OC₂H₅) | 121°–123° C. (0.2). | do | w=soluble, e=soluble. |
| 34 | N(C₂H₅)₂ | —COCH.CH₃ (OCH₂CH₃) | 122°–123° C. (0.05). | do | w=easily soluble, e=easily soluble. |
| 35 | do | CO—C₆H₃(OCH₃)₂ | 209°–210° C. (0.12). | do | w=little soluble, e=easily soluble. |
| 36 | do | CO—CH(CH₂—CH₂)(CH₂—CH₂)O | 173°–175° C. (0.35). | do | w=easily soluble, e=easily soluble. |
| 37 | do | CO— (methyl-pyridone) | 198°–200° C. (0.11). | solid, M. P. 79°–80° C. | w=soluble, e=easily soluble. |
| 38 | do | CO—(pyridyl) | 162°–164° C. (0.15). | liquid | w=easily soluble, e=easily soluble. |
| 39 | do | COC(CH₃)=C.CH₃ (isoxazole) | 170°–171° C. (0.35). | solid, M. P. 55°–56° C. | w=5% soluble, e=easily soluble. |
| 40 | do | —COC≡C.CH₃ | 135°–137° C. (0.15). | liquid | w=easily soluble, e=easily soluble. |
| 41 | do | —COC≡C.CH₂CH₃ | 138° C. (0.1) | do | w=soluble, e=easily soluble. |
| 42 | N (piperidyl with CH₃) | COCH=C(CH₃)₂ | 165°–167° C. (0.15). | do | w=difficultly soluble, e=easily soluble. |
| 43 | —N—CH (piperidyl, CH.CH₃) | CO.CON(C₂H₅)₂ | 195°–197° C. (0.1). | do | w=little soluble, e=easily soluble. |
| 44 | —N(CH₃)(C₂H₅) | —COC(CH₃)₃ | 132°–134° C. (0.27). | do | w=soluble, e=soluble. |

Example 16

34.4 parts of α-propylamino-n-butyric acid dimethyl amide (made according to Example 1 or by catalytical reduction of α-allylamino butyric acid dimethyl amide; boiling point at 12 mm. pressure=109°–111° C.) are dissolved in ether and then 9.4 parts of propionyl chloride are dropped thereinto under cooling. The working up is carried out, as described in Example 1. Boiling point at 0.2 mm. pressure=119°–120° C. and easily soluble in water and organic solvents.

Further compounds of the general formula $$CH_3CH_2CH.CON(R)_2$$
$$CH_3CH_2CH_2NR'$$

are enumerated in Table 13.

Table 13

| No. | R | R' | B. P., mm. | form | solubility in: w=water, e=ether |
|---|---|---|---|---|---|
| 1 | CH₃ | —COCH=CH.CH₃ | 128°–130° C. (0.25) | liquid | w=soluble, e=soluble. |
| 2 | C₂H₅ | do | 132°–133° C. (0.27) | do | w=little soluble, e=easily soluble. |
| 3 | CH₃ | —COCH(CH₂—CH)(CH₂—CH₂)O | 175°–176° C. (0.3) | do | w=easily soluble, e=easily soluble. |

*Table 13—Continued*

| No. | | R' | B. P., mm. | form | solubility in: w=water, e=ether |
|---|---|---|---|---|---|
| 4 | CH₃ | —COCH₃ | 128°–130° C. (0.2) | liquid | w=easily soluble, e=easily soluble. |
| 5 | do | —COCH₂CH₂CH₃ | 140°–143° C. (0.35) | do | Do. |
| 6 | CH₃ | —COCH(CH₃)₂ | 118° C. (0.16) | do | Do. |
| 7 | do | —COC(CH₃)₃ | 128° C. (0.2) | do | Do. |

EXAMPLE 17

30 parts of α-isopropylamino-n-butyric acid diethyl amide (preparation in an analogous manner to that described in Example 1; boiling point at 20 mm. pressure=120°–124° C., miscible with water and organic solvents) are dissolved in ether, cooled and treated, while stirring, with 8 parts of isovalerianic acid chloride. By the usual working up there is obtained the acyl compound having the boiling point of 123°–126° C. at a pressure of 12 mm. and being a little soluble in water and easily soluble in organic solvents.

Moreover, the following compounds of the general formula

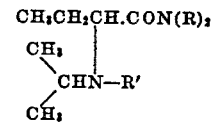

may be produced according to Example 17.

*Table 14*

| No. | R | R' | B. P., mm. | form | solubility in: w=water, e=ether |
|---|---|---|---|---|---|
| 1 | CH₃ | —COCH₃ | 120°–121° C. (0.1) | solid, M.P. 77°–78° C. | w=easily soluble, e=easily soluble. |
| 2 | do | —COCH₂CH₃ | 126°–127° C. (0.01) | solid, M.P. 46°–47° C. | Do. |
| 3 | do | —COCH=CH.CH₃ | 130° C. (0.04) | solid, M. P. 86°–88° C. | Do. |
| 4 | C₂H₅ | do | 123°–125° C. (0.15) | liquid | w=moderately soluble, e=easily soluble. |
| 5 | do | —CO.CON(C₂H₅)₂ | 150°–152° C. (0.25) | do | Do. |
| 6 | CH₃ | —COCH.CH₃ / OC₂H₅ | 124°–125° C. (0.1) | do | w=easily soluble, e=easily soluble. |
| 7 | do | —COCH.C₂H₅ / OCH₃ | 123°–125° C. (0.2) | do | Do. |
| 8 | C₂H₅ | —CO—C₅H₄N | 170° C. (0.25) | solid, M. P. 77°–78° C. | Do. |
| 9 | CH₃ | —COC₂H₅ | 126° C. (0.3) | liquid | w=soluble, e=soluble. |

EXAMPLE 18

29.7 parts of α-allylamino-n-butyric acid diethyl amide (preparation according to Example 1; boiling point at 13 mm. pressure=128°–130° C.; miscible with water and organic solvents) are dissolved in dry ether and then, while cooling, 11 parts of diethyl oxamic acid chloride are caused to drop thereinto. The working up is carried out, as mentioned in Example 1, whereupon the product is rectified in high vacuo; boiling point at 0.22 mm. pressure=171°–173° C., soluble in water and organic solvents.

Further compounds of the following general formula are enumerated in the Table 15.

*Table 15*

| No. | R | R' | B. P., mm. | form | solubility in: w=water, e=ether |
|---|---|---|---|---|---|
| 1 | CH₃ | —COCH₃ | 105° C. (0.1) | liquid | w=soluble, e=soluble. |
| 2 | do | —COCH₂CH₃ | 114°–116° C. (0.1) | do | Do. |
| 3 | do | —COCH₂CH₂CH₃ | 120°–122° C. (0.25) | do | Do. |
| 4 | do | —COCH=CH.CH₃ | 132°–134° C. (0.2) | do | Do. |
| 5 | C₂H₅ | do | 138°–140° C. (0.2) | do | w=moderately soluble, e=soluble. |
| 6 | CH₃ | —COCH(CH₃)₂ | 115°–117° C. (0.18) | do | w=soluble, e=soluble. |
| 7 | do | —COCH₂CH₂CH₂CH₃ | 127°–129° C. (0.17) | do | w=moderately soluble, e=soluble. |

Table 15—Continued

| No. | R | R' | B. P., mm. | form | solubility in: w=water, e=ether |
|---|---|---|---|---|---|
| 8 | CH₃ | —COCH₂CH(CH₃)₂ | 125°–127° C. (0.25) | liquid | w=moderately soluble, e=soluble. |
| 9 | do | —COCH=C(CH₃)₂ | 122°–124° C. (0.15) | do | w=soluble, e=soluble. |
| 10 | do | —COC=C(CH₃)₂ with CH₃ | 135° C. (0.15) | do | w=moderately soluble, e=soluble. |
| 11 | do | —COCH.CH₃ / OC₂H₅ | 132°–133° C. (0.15) | do | w=soluble, e=soluble. |
| 12 | do | —COCH.CH₃ / O.CH(CH₃)₂ | 130°–132° C. (0.08) | do | Do. |

EXAMPLE 19

33 parts of α-n-butylamino-n-butyric acid diethyl amide (made analogously to Example 1; boiling point at 13 mm. pressure=135°–138° C., soluble in water and organic solvents) are dissolved in ether and treated under cooling with 11 parts of diethyl oxamic acid chloride. Then the mixture is worked up in an analogous manner to that described in Example 1, the final product having the boiling point 164°–166° C. at 0.08 mm. pressure and being moderately soluble in water and easily soluble in organic solvents.

Further compounds according to the general formula $$CH_3CH_2CH.CON(R)_2$$
$$CH_3CH_2CH_2CH_2N.R'$$

are shown in the following Table 16.

C.) are dissolved in ether and, while stirring and cooling, 7.8 parts of acetyl chloride are slowly added thereto. The working up corresponds to that of Example 1. The final product has the boiling point 117°–118° C. at 0.01 mm. pressure and is easily soluble in water as well as in organic solvents.

If, instead of acetyl chloride, crotonic acid chloride is used, a product is obtained boiling at 126°–127° C. at a pressure of 0.01 mm. and melting at 69°–70° C.

When using propionic acid chloride, there results N-propionyl-α-secondary-butylamino butyric acid dimethyl amide, B. P. at 0.21 mm.= 129°–131° C.

EXAMPLE 21

31.6 parts of β-ethylamino butyric acid dimethyl amide (boiling point at 12 mm. pressure=

Table 16

| No. | R | R' | B. P., mm. | form | solubility in: w=water, e=ether |
|---|---|---|---|---|---|
| 1 | CH₃ | —COCH₃ | 121°–122° C. (0.15) | liquid | w=soluble, e=soluble. |
| 2 | do | —COCH=CH.CH₃ | 135° C. (0.1) | do | Do. |
| 3 | do | COCH₂CH(CH₃)₂ | 125°–128° C (0.1) | do | w=soluble, e=easily soluble. |
| 4 | do | COCH=C(CH₃)₂ | 140°–141° C. (0.15) | do | Do. |
| 5 | C₂H₅ | COCON(CH₃)₂ | 156° C. (0.08) | do | w=soluble, e=soluble. |
| 6 | CH₃ | CO.CON(C₂H₅)₂ | 180°–182° C. (0.45) | do | Do. |
| 7 | do | —COCH.CH₃ / OC₂H₅ | 130° C. (0.12) | do | Do. |
| 8 | do | —COCH.C₂H₅ / OCH₃ | 128°–130° C. (0.1) | do | Do. |
| 9 | do | —COC₂H₅ | 143°–145° C. (0.25) | do | Do. |

EXAMPLE 20

37.2 parts of α-secondary butylamino butyric acid dimethyl amide (made analogously to Example 1; boiling point at 13 mm. pressure=112°

105°–106° C., miscible with water and organic solvents) are dissolved in 150 parts of ether and, while stirring and cooling, 10.4 parts of crotonic acid chloride are caused to drop thereinto. After some stirring the precipitate is filtered off and the reaction product is purified in the manner indicated in Example 1 and rectified in the high vacuo. Its boiling point at 0.1 mm. pressure is 135°–136° C.; it is easily soluble in water and organic solvents.

Example 22

37.2 parts of ethylamino isobutyric acid diethyl amide (prepared from α-bromoisobutyric acid diethylamide with ethylamine according to the indications made in Example 1; boiling point at 13 mm. pressure=115°–118° C., miscible with water and organic solvents) are dissolved in 200 parts by volume of absolute benzene and, while stirring and cooling, 10.6 parts of isobutyric acid chloride are caused to drop thereinto. After a certain time there is filtered and worked up, as described in Example 1, the final product having the boiling point 132°–133° C. at 0.1 mm. pressure and being easily soluble in water and organic solvents.

If, instead of α-ethylamino butyric acid diethyl amide, there will be used α-ethylamino methyl ethyl acetic acid dimethyl amide having the boiling point of 118°–120° C. at 13 mm. pressure (made from α-bromomethylethyl acetic acid dimethyl amide by interaction with ethylamine, as described in Example 1), N-isobutyryl-α-ethylamino methyl ethyl acetic acid dimethylamide boiling at 0.5 mm. pressure at 128°–130° C. is obtained; it is easily soluble in water as well as in organic solvents.

The following Table 17 contains some further compounds of a similar constitution according to the formula

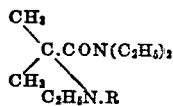

*Table 17*

| No. | R | B. P., mm. | form | solubility in: w=water, e=ether |
|---|---|---|---|---|
| 1 | COCON(C₂H₅)₂ | 167°–170° C. (0.2) | liquid | w=miscible, e=miscible. |
| 2 | CO–〈pyridyl〉 | 175° C. (0.3) | do | Do. |
| 3 | CO–〈CH₃, methylenedioxyphenyl〉 | 210° C. (0.15) | do | w=easily soluble, e=easily soluble. |

Example 23

30 parts of α-ethylamino-n-valerianic acid diethyl amide (made in the usual manner, boiling point at 12 mm. pressure=121°–124° C., soluble in water and organic solvents) are dissolved in 150 parts by volume of ether and then 5.2 parts of acetyl chloride are dropwise added thereto by cooling. The boiling point of the final product after purification is 125°–126° C. at 0.15 mm. pressure; this product is moderately soluble in water and easily soluble in ether.

In an analogous manner may be obtained N-propionyl-α-propylamino-n-valerianic acid dimethyl amide, B. P. at 0.25 mm. 141°–142° C., and N-acetyl-α-propylamino-n-valerianic acid dimethyl amide, B. P. at 0.15 mm. 120°–122° C.; both these compounds can be intermixed with water and with organic solvents.

Example 24

30 parts of α-ethylamino isovalerianic acid diethyl amide, which can be produced according to the indications made in Example 1 and boiling at 108°–110° C. at a pressure of 12 mm., are dissolved in 150 parts by volume of benzene, then treated under stirring and cooling with 11 parts of diethyl oxamic acid chloride, whereupon stirring is continued for some time. After the usual working up the new compound is obtained, the same having the boiling point 150°–152° C. at 0.12 mm. pressure and being soluble in water to about 5 per cent, but easily soluble in ether.

When starting from α-methylamino isovalerianic acid diethyl amide, a solid body melting at 68°–69° C. and boiling at 152°–153° C. at 0.1 mm. pressure is obtained, the same being soluble in water to about 5 per cent and readily soluble in organic solvents.

From α-ethylamino isovalerianic acid dimethyl amide there may be obtained, by means of acetyl chloride in ether, N-acetyl-α-ethylamino isovalerianic acid dimethyl amide, boiling point 94° C. at 0.01 mm. pressure and easily soluble in water as well as in organic solvents; by means of crotonic acid chloride there results the N-crotonyl-α-ethylamino isovalerianic acid dimethyl amide, boiling point at 0.05 mm. pressure=122°–124° C., this compound being also easily soluble in water and in organic solvents.

From α-propylamino isovalerianic acid dimethyl amide may be obtained in an analogous manner the following compounds: N-acetyl-α-propylamino isovalerianic acid dimethyl amide, B. P. 0.2 mm. 115°–117° C., soluble in water and in ether; N-propionyl-α-propylamino isovalerianic acid dimethyl amide, B. P. 0.1 mm 113°–115° C., soluble in water and in ether; N-crotonyl-α-propylamino isovalerianic acid dimethyl amide, B. P. 0.1 mm. 130°–132° C., soluble in water and in ether.

Further compounds of this group according to the general formula

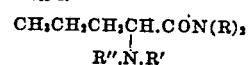

are enumerated in the following Table 18.

Table 18

| No. | R | R' | R'' | B. P., mm. | form | solubility in: w=water, e=ether |
|---|---|---|---|---|---|---|
| 1 | $CH_3$ | $-COCH_2CH_2CH_3$ | $C_2H_5$ | 119°–120° C. (0.015) | liquid | w=soluble, e=soluble. |
| 2 | do | $-COCH=CH.CH_3$ | do | 130° C. (0.08) | do | Do. |
| 3 | do | $-COCH_2-CH\begin{smallmatrix}CH_3\\CH_3\end{smallmatrix}$ | do | 130°–132° C. (0.2) | do | Do. |
| 4 | do | $-COCH=C\begin{smallmatrix}CH_3\\CH_3\end{smallmatrix}$ | do | 139°–141° C. (0.25) | do | Do. |
| 5 | $C_2H_5$ | do | $CH_3$ | 145°–146° C. (0.3) | do | w=moderately soluble, e=easily soluble. |
| 6 | do | $-CO.CON(C_2H_5)_2$ | do | 178°–180° C. (0.4) | do | w=soluble, e=soluble. |
| 7 | do | do | $C_2H_5$ | 180°–181° C. (0.2) | do | w=moderately soluble, e=soluble. |
| 8 | $CH_3$ | $-COCH.CH_3$ <br> $\ \ \ \ \ \ \ OC_2H_5$ | do | 135°–137° C. (0.1) | do | w=soluble, e=soluble. |

EXAMPLE 25

34.4 parts of β-ethylamino isovalerianic acid dimethyl amide (boiling point at 12 mm. pressure=107°–110° C.; miscible with water and organic solvents) are dissolved in 200 parts of toluene and dropwise treated below 0° C. with 12 parts of dimethyl acroyl chloride. The working up is carried out in the usual manner. Thus, the new compound having the boiling point of 130°–131° C. at 0.3 mm. pressure is obtained in a good yield; it is easily soluble in water and organic solvents.

When starting from β-ethylamino-β-methyl-β-ethyl propionic acid dimethyl amide and crotonic acid chloride, there will correspondingly be obtained a product boiling at 0.3 mm. pressure at 135° C. and being soluble in water and organic solvents.

EXAMPLE 26

32.1 parts of α-ethylamino-n-capronic acid dimethyl amide (boiling point at 12 mm. pressure=134°–135° C., soluble in water and organic solvents) are dissolved in 150 parts by volume of ether and, while cooling, treated dropwise with 8 parts of isovalerianic acid chloride. After purification the body boils at 126°–128° C., when distilled at a pressure of 0.1 mm., it is soluble in water as well as in organic solvents.

By interaction of α-propylamino capronic acid dimethyl amide with acetyl chloride there is obtained in an analogous manner a product boiling at a pressure of 0.28 mm. at 141°–144° C. and being soluble in water and in organic solvents.

The following Table 19 contains further compounds of the general formula

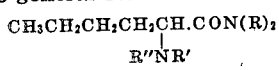
$$CH_3CH_2CH_2CH_2CH.CON(R)_2$$
$$\ \ \ \ \ \ \ \ \ \ \ \ \ \ \ \ \ \ \ \ \ \ \ \ \ \ \ R''NR'$$

Table 19

| No. | R | R' | R'' | B. P., mm. | form | solubility in: w=water, e=ether |
|---|---|---|---|---|---|---|
| 1 | $C_2H_5$ | $COCH=C\begin{smallmatrix}CH_3\\CH_3\end{smallmatrix}$ | $CH_3$ | 144°–145° C. (0.2) | liquid | w=little soluble, e=easily soluble. |
| 2 | do | $COCH_2CH\begin{smallmatrix}CH_3\\CH_3\end{smallmatrix}$ | $C_2H_5$ | 135°–138° C. (0.3) | do | Do. |
| 3 | $CH_3$ | $COCH=C\begin{smallmatrix}CH_3\\CH_3\end{smallmatrix}$ | do | 140°–141° C. (0.1) | do | w=soluble, e=soluble. |
| 4 | do | $COC=C\begin{smallmatrix}CH_3\\CH_3\end{smallmatrix}$ <br> $\ \ \ \ CH_3$ | do | 148°–150° C. (0.5) | do | Do. |
| 5 | do | $CO.CON(C_2H_5)_2$ | do | 190°–192° C. (.45) | do | Do. |
| 6 | do | $COCH_3$ | do | 120°–122° C. (0.14) | do | Do. |
| 7 | do | $COCH.CH_3$ <br> $\ \ \ \ OC_2H_5$ | $CH_3$ | 140°–142° C. (0.25) | do | Do. |
| 8 | do | $-COC_2H_5$ | $C_2H_5$ | 135° C. (0.2) | do | Do. |

EXAMPLE 27

40 parts of α-ethylamino oenanthylic acid dimethyl amide (boiling point at 12 mm. pressure=128°–130° C., miscible with water and organic solvents) are dissolved in 200 parts by volume of ether and, while stirring and cooling, 7.8 parts of acetyl chloride are dropwise added thereto. After a stirring for several hours the resulting precipitate is filtered off and, after having expelled the ether, the filtrate is rectified in high vacuo by distillation. Boiling point of this product at 0.06 mm. pressure=136°–137° C.; it is easily soluble in water and organic solvents.

Instead of acetyl chloride there may quite well be used acetic acid anhydride for the acylation.

EXAMPLE 28

195 parts of α-bromo-n-butyric acid ethyl ester are heated in the autoclave for 6 hours to 80° C. with an excess of ethylamine in 200 parts by volume of absolute benzene. Ethylamine hydrochloride thus precipitated is filtered off, while the filtrate is distilled. The boiling point of the resulting product at 30 mm. pressure amounts to 88°–90° C.

79.5 parts of the ethylamino-n-butyric acid ester thus obtained are dissolved in 200 parts by volume of dry ether, then under thorough cooling, 30 parts of isovalerianic acid chloride are dropwise added thereto and the whole is stirred during several hours at room temperature. Then ethylamino-n-butyric acid ester hydrochloride is filtered off, whereupon the ether is removed from the filtrate. Finally, the latter is distilled. The boiling point of the resulting product is 125°–128° C. at a pressure of 0.6 mm.

61 parts of N-isovaleroyl-α-ethylamino-n-butyric acid ester are boiled for 2 hours under reflux with 20 parts of caustic soda lye in 200 parts by volume of alcohol. After having added water the alcohol is removed and the filtrate is repeatedly shaken with ether, then made acid to Congo and the acid taken up into ether. Now, the ether is removed by distillation, the acid is treated with phosphorus pentachloride, the mixture stirred for some time at room temperature and finally heated to 50° C., whereupon the phosphorus oxychloride is distilled off. The residue, being the raw acid chloride, is taken up in ether and dropwise added in the cold to an ethereal solution of diethylamine. After filtration of the diethylamine hydrochloride there is worked up in the manner described in Example 1. The boiling point of the final product is 120°–122° C. at a pressure of 0.15 mm. This compound is somewhat soluble in water and easily soluble in organic solvents.

The same compound may also be obtained in a more advantageous manner, when starting from the α-ethylamino butyric acid diethyl amide and isovalerianic acid chloride.

EXAMPLE 29

31.6 parts of α-aminobutyric acid diethyl amide (boiling point at 12 mm. pressure=109°–111° C., miscible with water and organic solvents) are dissolved in 200 parts by volume of ether and, while stirring and cooling, 10.6 parts of n-butyric acid chloride are caused to drop thereinto. After stirring for several hours the resulting precipitation is filtered off, the filtrate freed from the ether and distilled in high vacuo. This product has the boiling point of 180°–182° C. at 0.2 mm. pressure.

22.8 parts of N-n-butyroyl-α-aminobutyric acid diethyl amide are heated to boiling in xylene with 4 parts of sodium amide, whereupon the mixture is cooled, treated with an excess of ethyl iodide and heated in the autoclave until completion of the reaction. The sodium iodide thus formed is eliminated and the filtrate rectified in high vacuo. Boiling point of the resulting product at 0.1 mm.

pressure=124°–126° C.; it is moderately soluble in water and easily soluble in organic solvents.

n-Butyroyl-α-aminobutyric acid amide can be triethylated in the same manner. Thus the same final compound is obtained. The same compound may also be prepared according to the method described in Example 1.

What we claim is:

1. An acylated aliphatic aminocarboxylic acid amide corresponding to the formula

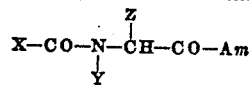

wherein Am stands for a radical of a secondary amine selected from the group consisting of

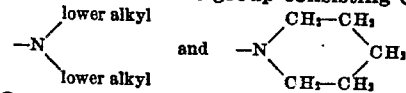

X—CO— stands for an acyl radical of a carboxylic acid selected from the group consisting of aliphatic and cycloaliphatic carboxylic acids with at most 7 carbon atoms, Y stands for a member selected from the group consisting of methyl, ethyl, propyl, butyl, allyl, cyclopentyl and cyclohexyl radicals, and Z stands for lower alkyl.

2. The acylated aliphatic aminocarboxylic acid amide of the formula

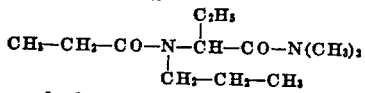

being a colorless liquid of the boiling point 119°–120° C. at 0.2 mm.

3. The acylated aliphatic aminocarboxylic acid amide of the formula

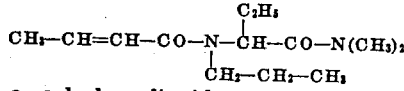

being a colorless liquid of the boiling point 128°–130° C. at 0.25 mm.

4. The acylated aliphatic aminocarboxylic acid amide of the formula

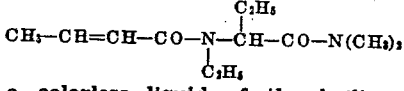

being a colorless liquid of the boiling point 132°–134° C. at 0.03 mm.

HENRY MARTIN.
HANS GYSIN.

REFERENCES CITED

The following references are of record in the file of this patent:

UNITED STATES PATENTS

| Number | Name | Date |
|---|---|---|
| 697,730 | Liebrecht | Apr. 15, 1902 |
| 1,713,822 | Dox | May 21, 1929 |
| 1,886,481 | Hartmann | Nov. 8, 1932 |
| 2,084,626 | Tabern | June 22, 1937 |
| 2,115,681 | Hoffer | Apr. 26, 1938 |
| 2,126,329 | Hoffer | Aug. 9, 1938 |
| 2,188,244 | Langlois | Jan. 23, 1940 |
| 2,310,168 | Carlson | Feb. 2, 1943 |
| 2,388,154 | Katzman | Oct. 30, 1945 |

FOREIGN PATENTS

| Number | Country | Date |
|---|---|---|
| 129,967 | Germany | Apr. 21, 1902 |
| 98,236 | Sweden | Jan. 3, 1940 |

OTHER REFERENCES

Granacher, "Helv. Chim. Acta" (1925), vol. 8, pages 211 to 217.

Granacher et al., "Helv. Chimica Reta," pages 873 to 883 (1925), vol. 8.